Patented Feb. 9, 1954

2,668,758

UNITED STATES PATENT OFFICE 2,668,758

DEFOLIANT COMPOSITIONS

Elizabeth S. Roos, Belleville, Ill., and Philip C. Hamm, Webster Groves, Mo., assignors to Monsanto Chemical Company, St. Louis, Mo., a corporation of Delaware No Drawing. Application July 3, 1952,
Serial No. 297,177

18 Claims. (Cl. 71—2.7)

This invention relates to the defoliation and/or killing of plants and more specifically pertains to defoliant compositions comprising as their active ingredients a tetraalkyl urea or thiourea, as well as a method of defoliating crop plants.

It is an object of this invention to provide compositions which are exceedingly useful as defoliants for crop plants. It is a further object of this invention to provide a method for defoliating crop plants so that the crop plant can be more readily harvested by mechanical means. Still another object will appear from the description of the invention.

The removal of foliage from such crop plants as the bean, corn, cotton, potato, and legume is a procedure which has many advantages and it is a problem with which many agriculturists are presently concerned. Many advantages of defoliation prior to the harvesting of the plant crop can be obtained. For example, the harvesting time and maturation of the crop can be accelerated. This is of primary importance when approaching weather changes due to a change in seasons at or near the time for harvest would impair the quality of the crop or lead to a total loss of the crop if it were allowed to remain in the field unharvested. Also, by defoliation prior to harvesting, a considerable increase in quality of the plant crop may be achieved. For example, in considering an individual crop, such as cotton, one finds defoliation lessens staining of fibers, thereby resulting in a higher ultimate grading of the harvested cotton fibers. Also, the amount of seed that can be lost during the harvesting of a trashy field can become a sizeable quantity, up to about 50%. Thus, the removal of crop plant foliage and induced drying of seed plants not only eliminates clogging of the harvester, but also the loss of seed with rubbage. In the production of soybeans, an additional advantage achieved by the acceleration of harvesting is that the operator then has ample time to sow a winter cover crop, such as winter wheat, in the same ground.

It has been discovered that tetraalkyl ureas and tetraalkyl thioureas and compositions containing them as the essential active ingredients are excellent defoliants. They are effective when used with a suitable inert diluent as a carrier, as in aqueous dispersion and aqueous emulsions, oil dispersions and dusts and when employed in concentrations of from 0.01% to 10% by weight. Such compositions not only accomplish defoliation of crop plants, but also kill the weeds growing with the crop plants. These results can be achieved by the application of from about 5 pounds to 50 pounds of the active ingredient per acre.

The tetraalkyl ureas and tetraalkyl thioureas employed as active ingredients in the composition of this invention possess the general formula:

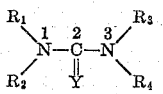

wherein Y is a chalkogen element occurring in one of the short periods of the periodic table, that is, sulphur and oxygen; and $R_1$, $R_2$, $R_3$ and $R_4$ are alkyl groups. Each of the R groups can be the same or different alkyl groups. Also $R_1$ and $R_2$ can be the same alkyl group and $R_3$ and $R_4$ can be the same alkyl group but differing from the alkyl groups on the nitrogen one position. The active ingredients preferred for the compositions of this invention are the symmetrical tetraalkyl ureas and thioureas, all the alkyl groups are the same, and each alkyl group contains 1 to 10 carbon atoms.

Specific members of this preferred class of active ingredients include tetramethyl urea and thiourea, tetraethyl urea and thiourea, tetrapropyl urea and thiourea, tetraisopropyl urea and thiourea, tetrabutyl urea and thiourea, tetraisobutyl urea and thiourea, tetra-tert.-butyl urea and thiourea, the tetraamyl ureas and thioureas, the tetrahexyl ureas and thioureas, the tetraheptyl ureas and thioureas, the tetraoctyl ureas and thioureas, the tetraanonyl ureas and thioureas, and the tetradecyl ureas and thioureas.

As hereinbefore stated, the compositions of this invention can be prepared in numerous ways. For example, the aqueous dispersions containing from about 0.01% to about 10% by weight, or higher, of the active ingredients and from about 0.1% to about 5% by weight of a dispersing or wetting agent to be prepared by dispersing the active ingredients in an aqueous solution containing the dispersing or wetting agent.

Aqueous colloidal dispersions or emulsions can also be prepared by dissolving the active ingredients in the smallest amount of a water-immiscible organic solvent which will dissolve the quantity of active ingredient to be used. Then, this solution is colloidally dispersed in water by mechanical means, as with a homogenizer, or by means of a suitable emulsifying agent.

Still another type of aqueous spray formulation can be employed. The active ingredients are

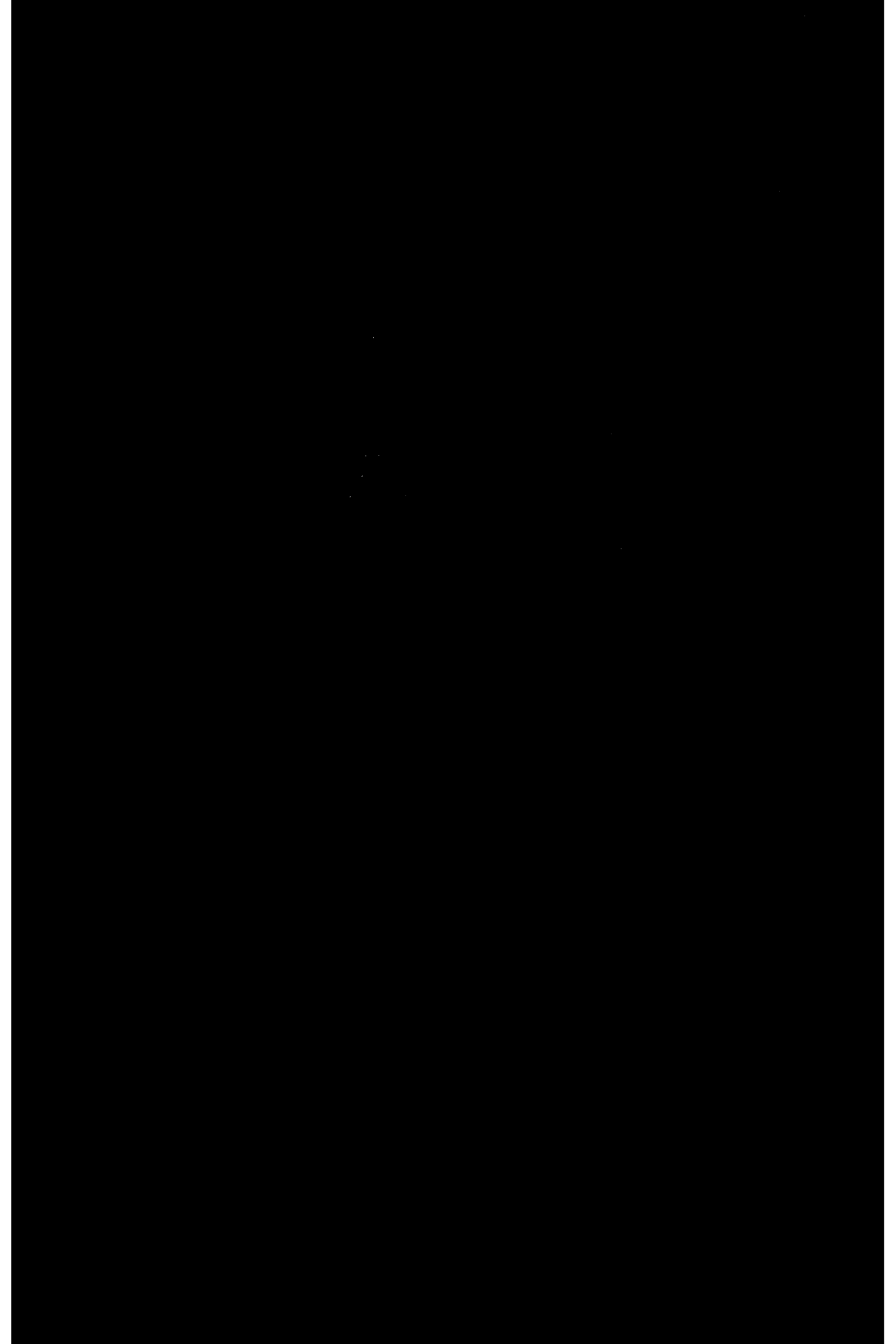

Example V

A defoliant dust composition was prepared by uniformly dispersing 5% by weight of tetrabutyl urea in a finely-divided pulverulent clay. This composition was applied to block and row planted soybeans at the rate of 20 pounds of active ingredient per acre. Several days following treatment, during which time the average temperature was about 70° F., the bean leaves dried and dropped from the main stem. Also, during this period, the majority of the pods completed development. Harvesting was begun 5 days after treatment. Because of the absence of soybean foliage and green weeds, no difficulties were encountered during harvesting.

Example VI

A defoliant composition, similar to that used in Example V, was applied at the rate of about 20 pounds of active ingredient per acre to the foliage of cotton plants when the majority of the bolls were about 3 to 5 weeks old. Within a week, all leaves were abscissed. Young, as well as old bolls, continued to mature during and following the defoliation period. Cotton of exceedingly high quality was obtained by both hand picking and mechanical stripping.

An aqueous emulsion, such as the one described in Example I, when applied to green potato vines when the tubers reach maturity brings about rapid defoliation and drying of the vines. The vines thus dried can be broken up and removed from the hills in the usual manner before digging the tubers.

Aqueous emulsions, dusts, and oil emulsions, such as described in the examples above, as well as oil and water emulsions can be applied to the foliage of maturing corn to hasten the drying of the husk and ear. In this manner the corn can be harvested during favorable weather with a low moisture content.

Such legume hay crops as alfalfa and the various clovers, which are grown for seed, can also be treated with the compositions of this invention. Where such applications are made to these plants, the plants defoliate and the stems dry and become friable so that harvesting of the seed may be accomplished during favorable weather. Also, separation of the seed and the dried plant foliage can be obtained with exceedingly high efficiencies. The resulting harvested seed will be found to be extremely free from plant rubbage.

Having described this invention by numerous compositions containing one specific tetraalkyl urea, it is not thereby desired or intended that this invention be limited solely to the use of this specific active ingredient; for as hereinbefore stated, other tetraalkyl ureas, as well as tetraalkyl thioureas, can be employed as active ingredients in the compositions of this invention. Also, the precise proportions of the materials employed can be varied as desired or as the type of spraying equipment requires. In addition, any of the wetting agents of the numerous classes hereinbefore set forth can be used in the preparation of the preferred compositions of this invention. Numerous other modifications and variations of the compositions described above can be made without departing from the spirit and scope of the invention as defined in the appended claims.

What is claimed is:

1. A composition useful as a plant defoliant comprising, as the essential active ingredient, from 0.01% to 10% by weight of a compound having the formula

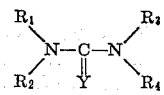

wherein Y is a chalkogen selected from the group consisting of oxygen and sulfur and wherein $R_1$, $R_2$, $R_3$ and $R_4$ are alkyl groups; and, as the fluent carrier therefor, an inert diluent containing from 0.1% to 5% by weight of a wetting agent.

2. A plant defoliant composition which comprises, as the essential active ingredient, from 0.01% to 10% by weight of a compound having the formula

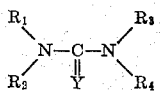

wherein Y is a chalkogen selected from the group consisting of oxygen and sulfur and wherein $R_1$, $R_2$, $R_3$ and $R_4$ are alkyl groups; and a fluent carrier containing from 0.1% to 5% by weight of a wetting agent.

3. A plant defoliant composition which comprises, as the essential active ingredient, from 0.01% to 10% by weight of a compound having the formula

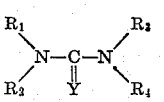

wherein Y is a chalkogen selected from the group consisting of oxygen and sulfur and wherein $R_1$, $R_2$, $R_3$ and $R_4$ are alkyl groups; and a fluent carrier therefor containing a wetting agent.

4. A plant defoliant composition which comprises, as the essential active ingredient, from 0.01% to 10% by weight of a tetraalkyl urea dispersed in a fluent carrier containing from 0.1% to 5% of a wetting agent.

5. A plant defoliant composition which comprises, as the essential active ingredient, from 0.01% to 10% by weight of a tetraalkyl urea dispersed in an aqueous solution containing from 0.1% to 5% of a wetting agent.

6. A plant defoliant composition which comprises, as the essential active ingredient, from 0.01% to 10% by weight of a tetraalkyl urea dispersed in a mixture comprising a wetting agent and a hydrocarbon oil containing from 10 to 20 carbon atoms.

7. A plant defoliant composition which comprises, as the essential active ingredient, from 0.01% to 10% by weight of a tetraalkyl urea dispersed in a finely-divided pulverulent solid.

8. A plant defoliant composition which comprises, as the essential active ingredient, from 0.01% to 10% by weight of a tetraalkyl urea dispersed in a carrier comprising a finely-divided pulverulent solid containing 0.1% to 5% of a wetting agent.

9. A plant defoliant composition which comprises, as the essential active ingredient, from 0.1% to 5% by weight of tetrabutyl urea, and, as a carrier therefor, an inert diluent containing a wetting agent.

10. A plant defoliant composition which comprises, as the essential active ingredient, from 0.1% to 5% by weight of tetrabutyl urea and, as a carrier therefor, an aqueous solution of a wetting agent.

11. A plant defoliant composition which comprises, as the essential active ingredient, from 0.1% to 5% by weight of tetrabutyl urea and, as a carrier therefor, a hydrocarbon oil containing a wetting agent.

12. A plant defoliant composition which comprises, as the essential active ingredient, from 0.1% to 5% by weight of tetrabutyl urea and, as a carrier therefor, a finely-divided pulverulent solid.

13. The method which comprises applying to plants at a rate sufficient to cause defoliation of said plants, a compound having the formula

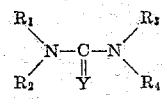

wherein Y is a chalkogen selected from the group consisting of oxygen and sulfur and wherein $R_1$, $R_2$, $R_3$ and $R_4$ are alkyl groups.

14. The method which comprises applying to plants a tetraalkyl urea at a rate sufficient to cause defoliation of said plants.

15. The method which comprises applying to plants, tetrabutyl urea at a rate sufficient to cause defoliation of said plants.

16. The method of defoliating plants which comprises applying to said plants a tetraalkyl urea at the rate of from about 5 to about 50 pounds per acre.

17. The method of defoliating plants which comprises applying tetrabutyl urea to said plants at the rate of from about 5 to about 50 pounds per acre.

18. The method of defoliating plants which comprises applying to said plants a composition comprising tetrabutyl urea and a wetting agent at the rate of from about 5 to about 50 pounds per acre of the alkyl urea.

ELIZABETH S. ROOS.
PHILIP C. HAMM.

References Cited in the file of this patent

Chemical Abstracts, vol. 40 (1946) col. 5490$^6$.
Chemical Abstracts, vol. 22 (1928) col. 422$^9$.